US008781128B2

(12) United States Patent
Gandhi et al.

(10) Patent No.: US 8,781,128 B2
(45) Date of Patent: Jul. 15, 2014

(54) METHOD AND DEVICE FOR AUTOMATICALLY DISTRIBUTING UPDATED KEY MATERIAL

(71) Applicant: Research In Motion Limited, Waterloo (CA)

(72) Inventors: Shivangi Anantrupa Gandhi, Brampton (CA); Ravi Singh, Toronto (CA); Neil Patrick Adams, Waterloo (CA); Van Quy Tu, Kitchener (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/751,261

(22) Filed: Jan. 28, 2013

(65) Prior Publication Data

US 2013/0138951 A1    May 30, 2013

Related U.S. Application Data

(63) Continuation of application No. 12/854,928, filed on Aug. 12, 2010, now Pat. No. 8,379,862.

(51) Int. Cl.
*H04L 9/00*    (2006.01)
*H04L 9/32*    (2006.01)

(52) U.S. Cl.
USPC ............ 380/277; 380/282; 713/189; 713/192

(58) Field of Classification Search
USPC ................... 380/30, 255, 277–279, 282, 286; 713/150, 156, 158, 161, 168–171, 181, 713/189, 192–194
See application file for complete search history.

(56) References Cited

U.S. PATENT DOCUMENTS

| | | | |
|---|---|---|---|
| 5,748,735 A * | 5/1998 | Ganesan ........................ 713/165 |
| 5,923,756 A * | 7/1999 | Shambroom .................. 713/156 |
| 7,305,545 B2 | 12/2007 | Filipi-Martin et al. |
| 7,516,321 B2 * | 4/2009 | Chen et al. ..................... 713/155 |
| 7,664,947 B2 | 2/2010 | Fang |
| 8,379,862 B2 * | 2/2013 | Gandhi et al. ................. 380/277 |
| 2002/0106085 A1 | 8/2002 | Jain et al. |
| 2003/0196080 A1 | 10/2003 | Karman |
| 2005/0244009 A1 | 11/2005 | Brown et al. |
| 2007/0186105 A1 | 8/2007 | Bailey et al. |
| 2008/0016337 A1 | 1/2008 | Morgan et al. |
| 2009/0257593 A1 | 10/2009 | Losovsky |

OTHER PUBLICATIONS

Extended European Search Report dated Jan. 21, 2011 for corresponding European Patent Application No. 10172576.0.
"Re: Certificate with missing private key"; http://www.derkeiler.com/Newsgroups/microsoft.public.platformsdk.security/2008-06/msg00034.html; 2 pages.

(Continued)

*Primary Examiner* — Hosuk Song
(74) *Attorney, Agent, or Firm* — Ridout & Maybee LLP

(57) ABSTRACT

A method for handling an encrypted message received on an electronic device that has not been encrypted using a current public key. The portable electronic device automatically generates a reply message to the sender in response to determining that the message has not been encrypted with the current public key. The reply message may contain the current public key of the recipient device, and may request the sender to resend the message encrypted with the current public key.

34 Claims, 6 Drawing Sheets

(56) References Cited

OTHER PUBLICATIONS

"What are the steps to recover the private key on an SSL Certificate in an IIS environment?" SSl.Certificates; Entrust; Securing your online business: http://www.entrust.net/knowledge-base/technote.cfm?tn=7905; 6 pages; Last Modified Jul. 15, 2010.

"How To: Reconstruct your private key for windows"; https://pgp.custhelp.com/app/answers/detail/a_id/581/~/hot-to-reconstruct-your-private-key-for-window; 4 pages; 2002-2010 PGP Corporation.

* cited by examiner

METHOD AND DEVICE FOR AUTOMATICALLY DISTRIBUTING UPDATED KEY MATERIAL

CROSS-REFERENCE TO RELATED APPLICATIONS

This application is a continuation of U.S. patent application Ser. No. 12/854,928, filed Aug. 12, 2010, the disclosure of which is incorporated herein by reference.

TECHNICAL FIELD

The present disclosure relates to portable electronic devices and in particular to asymmetric encryption of messages on the portable electronic device.

BACKGROUND

In asymmetric encryption, a recipient of an encrypted message may not be able to decrypt an encrypted message if the recipient device does not have the correct private key. A recipient device may not have the correct private key for several reasons, such as: 1) the recipient device's private key has expired and has been deleted and where the sender still encrypts messages using the expired public key; or 2) the recipient device has loaded a new build and has not imported private keys into a local key database.

Conventional solutions may involve the recipient leaving the messaging application and going into an options application that will allow the user to import the smart card keys. The recipient would then return to the messaging application. In an instance where the private key does not exist anymore, the recipient device cannot decrypt the message and it may be deleted unread. There is a need for a solution that makes it easier to deal with messages that are not decryptable.

DETAILED DESCRIPTION OF EXAMPLE EMBODIMENTS

Figure 1:
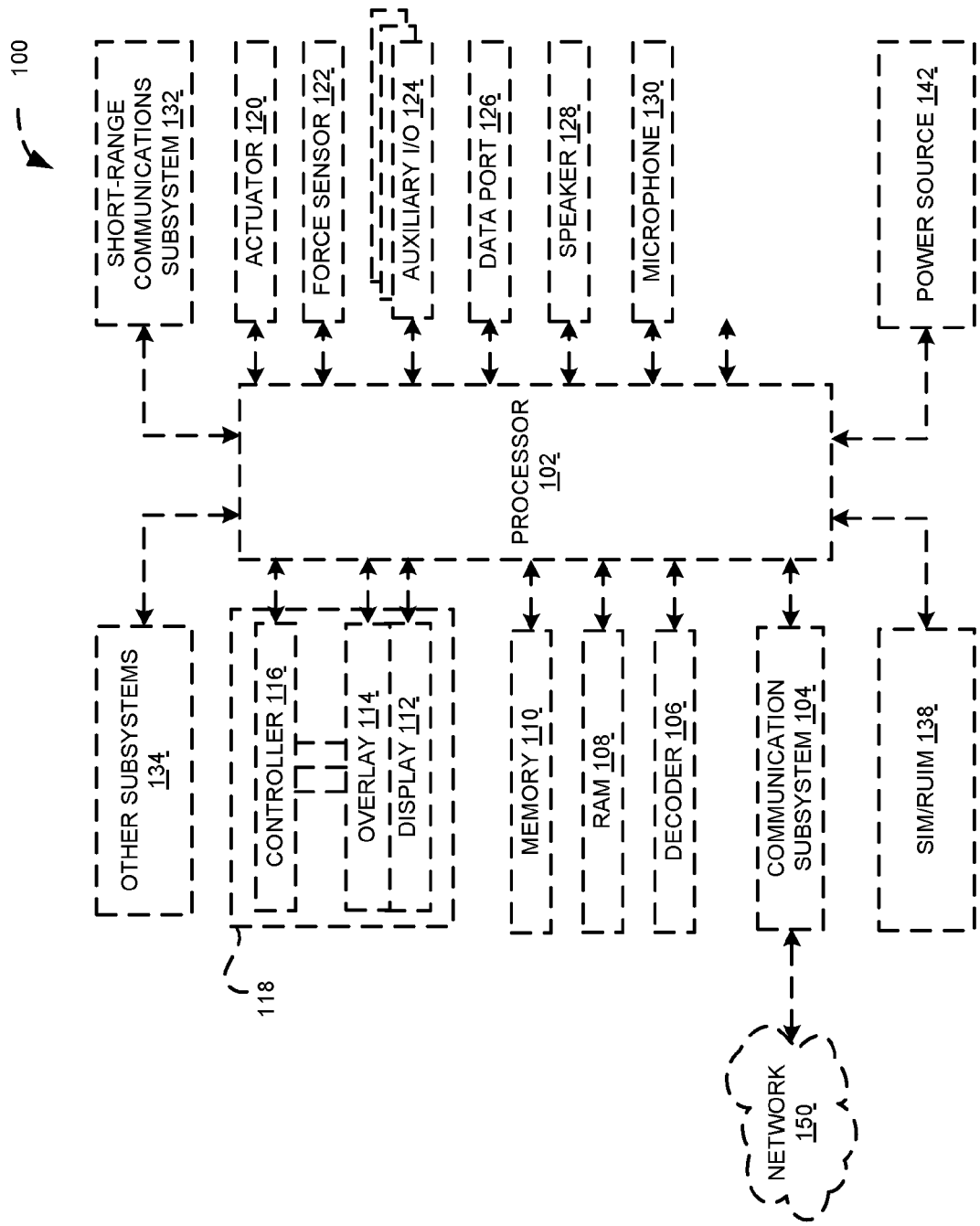
FIG. 1 is a simplified block diagram of components of a portable electronic device in accordance with one example embodiment of the present disclosure.
Figure 1A:
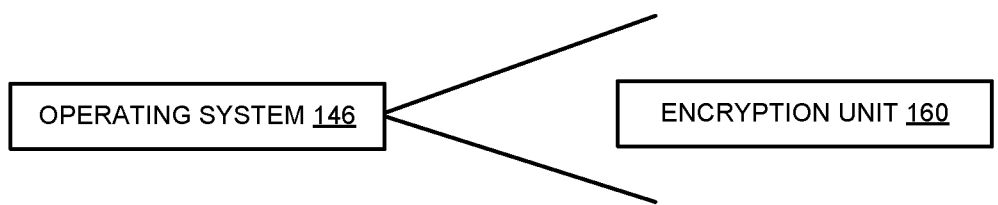
FIG. 1A is schematic diagrams showing select applications or routines of the portable electronic device of FIG. 1.
Figure 1B:
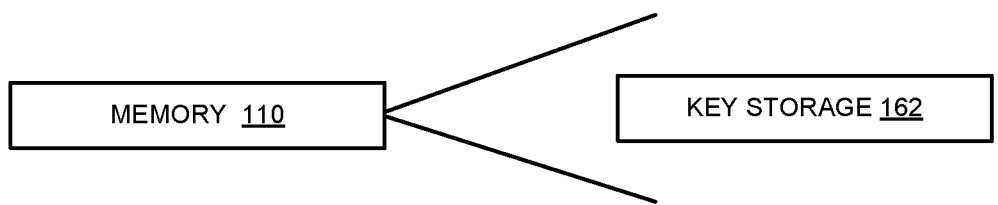
FIG. 1B is schematic diagrams showing select databases stored in the memory of the portable electronic device of FIG. 1.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The present disclosure relates to secure messaging and provides a method for handling an encrypted message received on an electronic device where the message has not been encrypted using the current public key for the electronic device. The portable electronic device automatically generates a reply message to the sender in response to determining that the encrypted message has not been encrypted using the current public key. The reply message may notify the sender that the message could not be decrypted and to stop using the old public key to encrypt messages to the recipient. The reply message may also contain the current public key of the recipient, and may request the sender to resend the message encrypted with the current public key.

In accordance with one embodiment of the present disclosure, there is provided a method of secure messaging using an electronic device. The method includes storing a current key pair in memory on the device, the current key pair including a current public key and a current private key; receiving, at a device, an encrypted message sent by a sender; determining that the encrypted message is not encrypted with the current public key; and automatically sending a reply message to the sender in response to determining that the encrypted message is not encrypted with the current public key, wherein the reply message includes the current public key.

In accordance with another embodiment of the present disclosure, there is provided a method of secure messaging comprising detecting a new public key on an electronic device, and, in response to detecting the new public key, sending a message containing the new public key to all contacts stored on the electronic device.

In accordance with a further embodiment of the present disclosure, there is provided an electronic device. The device includes a communication subsystem for sending and receiving communications over a network; a memory storing a current key pair, the current key pair including a current public key and a current private key; a processor; and a messaging application having computer-executable instructions which, when executed, configure the processor to perform one or more of the methods described herein.

In yet another aspect, the present application describes a non-transitory computer-readable medium storing computer-executable instructions, which when executed configured a processor perform any one or more of the methods described herein.

The present disclosure generally relates to an electronic device, which in this example embodiment is a portable electronic device 100. It will be understood that the present application is not limited to portable electronic devices and may be implemented using non-portable electronic devices, such as personal or desktop computers. Examples of portable electronic devices 100 include mobile, or handheld, wireless electronic devices such as pagers, cellular phones, cellular smartphones, wireless organizers, personal digital assistants, wirelessly enabled notebook computers, and so forth. The portable electronic device 100 may also be a portable electronic device 100 without wireless communication capabilities, such as a handheld electronic game device, laptop, or other device, provided it has messaging capabilities as will be described below.

The present description of example embodiments does not limit implementation to any particular computer programming language or system architecture. Embodiments described in the specification are not limited to any particular operating system (OS), mobile device architecture, server architecture, or computer programming language.

A block diagram of an example of a portable electronic device 100 is shown in FIG. 1. The portable electronic device 100 includes multiple components, such as a processor 102 that controls the overall operation of the portable electronic device 100. Communication functions, including data and voice communication, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communication. A power source 142, such as one or more rechargeable batteries or a port to an external power supply, powers the portable electronic device 100.

The processor 102 interacts with other components, such as Random Access Memory (RAM) 108, memory 110, a display screen 112 (such as a liquid crystal display (LCD)) with a touch-sensitive overlay 114 operably connected to an electronic controller 116 that together comprise a touch-sensitive display 118, one or more actuators 120, one or more force sensors 122, one or more auxiliary input/output (I/O) subsystems 124, a data port 126, a speaker 128, a microphone 130, short-range communication subsystem 132, and other device subsystems 134. User-interaction with a graphical user interface (GUI) is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device 100, is displayed on the touch-sensitive display 118 via the processor 102.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software applications or programs 148 that are executed by the processor 102 and are typically stored in a persistent, updatable store such as the memory 110. Additional applications or programs 148 may be loaded onto the portable electronic device 100 through the wireless network 150, the auxiliary I/O subsystem 124, the data port 126, the short-range communication subsystem 132 or any other suitable subsystem 134.

A received signal such as a text message, an e-mail message, or web page download is processed by the communication subsystem 104 and input to the processor 102. The processor 102 processes the received signal for output to the display screen 112 and/or to the auxiliary I/O subsystem 124. A subscriber may generate data items, for example e-mail messages, which may be transmitted over the wireless network 150 through the communication subsystem 104. For voice communication, the overall operation of the portable electronic device 100 is similar. The speaker 128 outputs audible information converted from electrical signals, and the microphone 130 converts audible information into electrical signals for processing.

Figure 2:
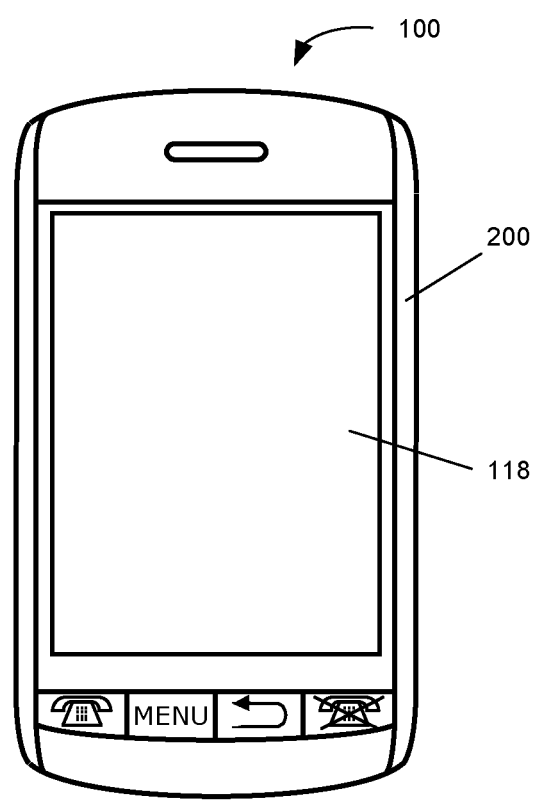
FIG. 2 is a front view of an example of a portable electronic device 100 in a portrait orientation.

FIG. 2 shows a front view of an example of a portable electronic device 100 in portrait orientation. The portable electronic device 100 includes a housing 200 that houses internal components including internal components shown in FIG. 1 and frames the touch-sensitive display 118 such that the touch-sensitive display 118 is exposed for user-interaction therewith when the portable electronic device 100 is in use. It will be appreciated that the touch-sensitive display 118 may include any suitable number of user-selectable features rendered thereon, for example, in the form of virtual buttons for user-selection of, for example, applications, options, or keys of a keyboard for user entry of data during operation of the portable electronic device 100.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or, other barrier, and a cover. The capacitive touch sensor layers may be any suitable material, such as patterned indium tin oxide (ITO).

The auxiliary I/O subsystems 124 could include other input devices such as one or more control keys, a keyboard or keypad, navigation device, or any combination thereof. The navigation device may be a depressible/clickable trackball, a depressible/clickable scroll wheel, a touch-sensitive optical trackpad, or a touch-sensitive touchpad.

In yet other embodiments, a conventional display screen may be provided instead of the touch-sensitive display 118. In such embodiments, input may be provided via one or more control keys, a keyboard or keypad, navigation device or any combination thereof.

The present disclosure involves public key cryptography. An asymmetric key algorithm creates a related public key/private key pair for each user or portable electronic device 100. A public key of a recipient is used by a sender to encrypt outgoing messages. A public key of the sender may be used by a recipient to verify digital signatures on incoming messages if the sender signed the message using their private key. A private key of the recipient may be used to decrypt incoming messages that have been encrypted using the recipient's corresponding public key.

In some embodiments, a message from a sender may first be encrypted using a temporary session key. The session key is then encrypted using the public key of the recipient. Once the recipient receives the encrypted message, the recipient decrypts the session key using the corresponding public key to recover the temporary session key. The temporary session key may then be used to decrypt the data portion of the message. Any message format that permits encryption and decryption of the message may be used. For example, the type of message may include email, SMS and IM messages.

The user's public/private key pair and public keys of recipients are stored in a key storage 162 in the memory 110 of the portable electronic device 100. The key storage 162 may include any portion of memory 110 on the device 100. In some embodiments, the memory 110 may include a secure area in which sensitive data, such as key material, is stored. In some embodiment, the secure area may itself be secured using cryptography to prevent unauthorized access. In an embodiment, a device's public/private key pair is acquired after the device authenticates itself with a remote server using credentials such as an associated email address. Once a device has been authenticated, the portable electronic device 100 retrieves the public/private key pair from the remote server.

Where a device is configured to encrypt a message, the portable electronic device 100 searches for a valid public key for the recipient in the key database 162, or any available remote server containing public key information. If a valid public key is found, the portable electronic device 100 may encrypt the message with the recipient's public key before it is sent. Where there is no valid public key found, the portable electronic device 100 may be configured to not send the message or to send the message in unencrypted form. The portable electronic device 100 may also retrieve the public key of a recipient from a received email message from that recipient.

The portable electronic device 100 also includes an encryption unit 160 that obtains keys from the key storage 162 and performs secure messaging functions. The secure messaging functions performed on the portable electronic device 100 include encrypting a message with a recipient's public key, decrypting a message using the device's private key, signing a message with a device's private key, and authenticating a received message using a recipient's public key.

In example embodiments described herein, a device may store more than one key pair. The terms "current key pair", "current public key" and "current private key" are used to refer to the primary or current keys the device is configured to use for secure communications. In addition to a current key pair, a device may store other keys, including an operative but secondary key pair, or an older expired key pair. In some cases older keys that have been expired are deleted from the key storage 162; however, in some instances old expired keys may be retained in the storage 162 or may be inadvertently copied to the key storage 162, such as during a device re-authentication or provisioning process in which portions of the device memory are stored from a secure remote location, if the secure remote location stores old key material.

Figure 3:
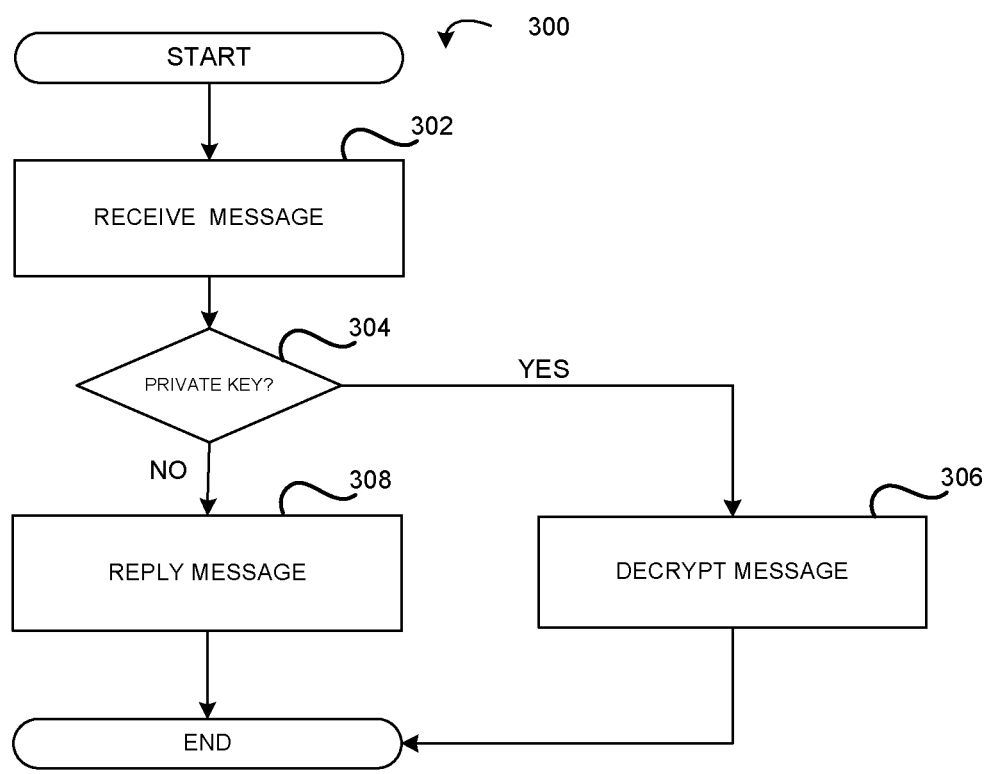
FIG. 3 is a flowchart illustrating a method of sending a reply message to a sender when a message cannot be decrypted by the recipient in accordance with one example embodiment of the present disclosure.

FIG. 3 illustrates a method of automatically distributing updated key material according to an example embodiment of the present disclosure. After the recipient device receives an encrypted message (block 302), the portable electronic device 100 determines whether the encrypted message has been encrypted using the current public key. In some instances, this may include attempting to decrypt the message, or a portion of the message (such as the temporary session key) using the current private key. The device thus determines whether it has the correct private key to decrypt the message (block 304).

In some instances, the current key pair may not be located in memory on the device (block 304), in which case the portable electronic device 100 may attempt to import the correct current private key from the smart card or media card as there may be a current private key stored in one of these locations. If the current private key is located, the portable electronic device 100 will be able to decrypt the message. Once the current private key is located in the portable electronic device 100, the message will be decrypted using the appropriate private key (block 306).

If the device determines that the current public key was not used to encrypt the message, i.e. that the current private key is not capable of decrypting the message, then the device may be incapable of decrypting the message. The private key may not be located, for example, where it has been deleted from the portable electronic device 100. In response to determining that the received encrypted message cannot be decrypted using the current private key, the portable electronic device 100 automatically generates a reply to the sender (block 308). The reply generated by the portable electronic device 100 may notify the sender that the message could not be decrypted. The reply may be any data message, for example an email, SMS, or IM message. In some embodiments, the reply may further include the current public key. For example, the current public key may be sent as a certificate attachment to the reply message. In some embodiments, the reply message may also include a request that the sender resend the message encrypted with the current public key.

A sender that receives the reply message may update its own key storage with the current public key for the recipient to ensure that future messages are sent to the recipient using the correct current public key. As well, information in the reply message sent to the sender may be configurable.

In some instances, the received encrypted message has been encrypted using a public key for which the recipient device still has stored a private key, although not the current keys. For example, the message may have been encrypted using an expired key pair. In this case, the automatically generated reply from the receiver's portable electronic device 100 may contain both the expired private key and the current public key. For example, the automated reply may be signed with the expired private key and contain the correct public key. By signing the reply with the expired private key, the sender of the original message can verify that the received current public key is from the recipient.

In another embodiment, the device may find that there are no private keys on the portable electronic device 100. Under these circumstances, the portable electronic device 100 may obtain a new public/private key pair by sending a request to an authorized remote server, such as one with which the device is associated or from which the device previously obtained a public/private key pair. The device 100 may prompt the user to authorize the generation of new key material and may, in response to acceptance, automatically perform the steps of acquiring the key pair and storing the new current public/private key pair in the key storage 162. Once a new current public/private key pair has been generated for the device, the portable electronic device 100 may automatically generate and send the reply message to the sender (block 308) containing the new current public key of the recipient device.

The term "automatically", as used herein, is intended to include the device generating and sending the reply message without any user intervention or input, as well as the device generating a user prompt soliciting an input as to whether to send a reply message and sending the reply message in response to receipt of an input authorizing the reply message. The user prompt may include a dialog box or window displayed on a display screen, for example. The device may be configured to either send the reply message without receiving authorization, or to await user authorization before sending the reply message. In the latter case, the device may be generate and display a prompt asking as to whether a reply message should be sent to the sender and providing one or more selectable options. If an input is received selecting to have a reply message sent to the sender, the portable electronic device 100 may automatically generate the reply message and send it to the sender. As previously discussed, the reply message may notify the sender that the message was not decryptable. The prompt may also provide the option of including the current public key in the reply message. In an embodiment, if an input is received authorizing the sending of a reply message, then an auto-generated reply message may be displayed before sending, thereby providing the user the opportunity to supplement or modify the message.

In another embodiment, the reply message sent by the recipient device may include additional information such as the recipient device's phone number so that the original sender may call and confirm the key hash. As well, the information sent in the reply message may be configurable.

Figure 4:
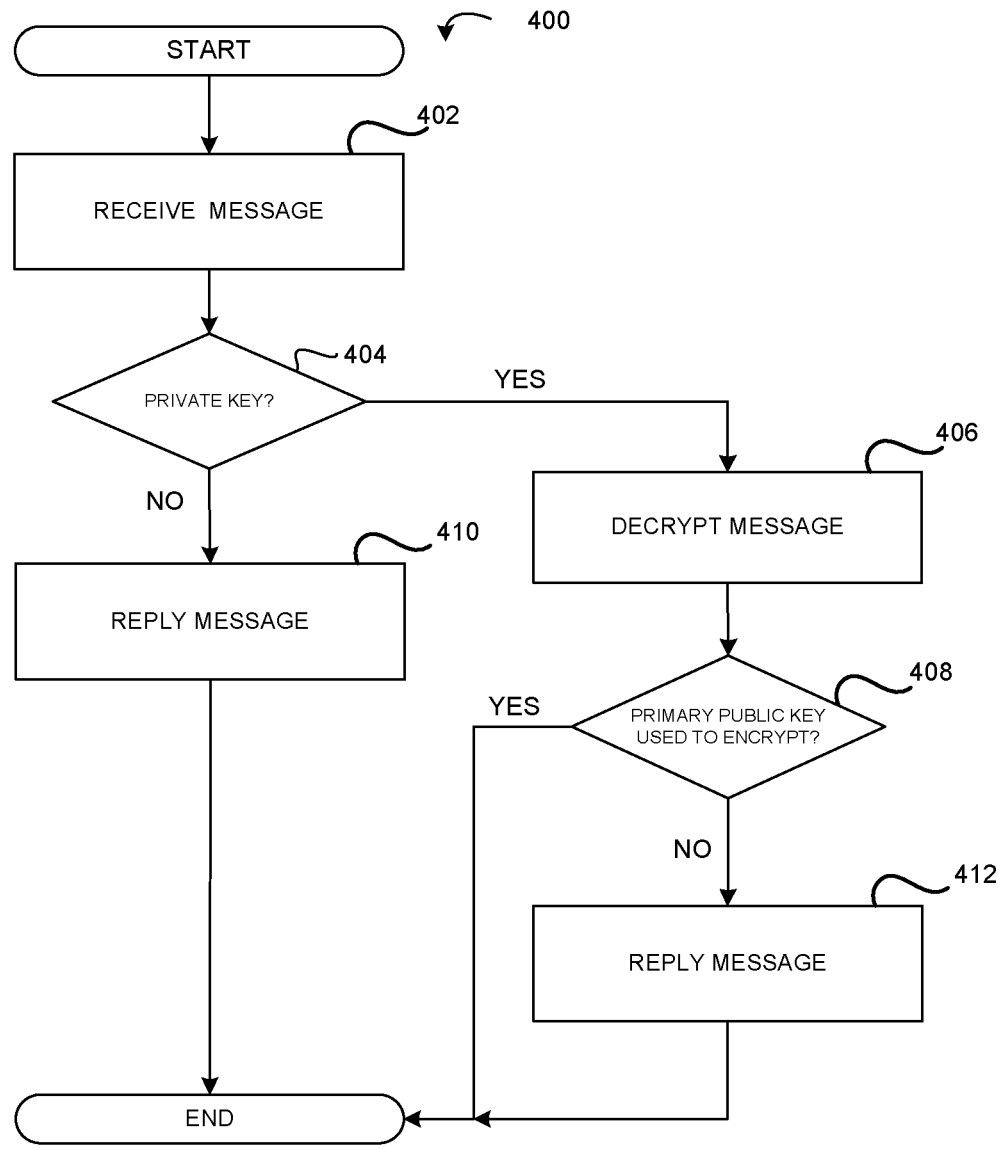
FIG. 4 is a flowchart illustrating a method of sending a reply message to a sender indicating a preferred public key to be used in accordance with one example embodiment of the present disclosure.

FIG. 4 illustrates another example method of secure messaging where a recipient has multiple valid key pairs, including a primary (current) key pair and one or more secondary key pairs, and prefers that the sender use the primary keys. After receiving an encrypted message (block 402), the recipient portable electronic device 100 determines whether it has the correct private key to decrypt the message (block 404). If the private key is not available, i.e. neither the current private key nor any secondary private keys will work to decrypt the message, the portable electronic device 100 will generate and send a reply message to the sender indicating that the message cannot be decrypted, and may include the current public key for the sender to use (block 410) in re-encrypting and re-sending the message. If the portable electronic device 100 has the correct private key, it will decrypt the message (block 406). Where the portable electronic device 100 has more than one valid key pairs, the portable electronic device 100 will determine whether the message had been encrypted using the preferred current public key. The device may have a user-configurable option to designate a particular key pair as the primary (current) key pair. Other valid key pairs on the portable electronic device 100 may be designated as secondary key pairs. Where the received message was encrypted using the current public key, the process ends. Where the received message was encrypted using a secondary public key, an automated reply may be generated and sent to the sender containing the primary current public key the sender should use in the future (block 412). The automatic reply message may be signed with the secondary private key so that the sender may verify that the new primary current public key is in fact from the recipient. In another embodiment, the user may be prompted as to whether to send the reply message containing the primary current public key to the sender.

Figure 5:
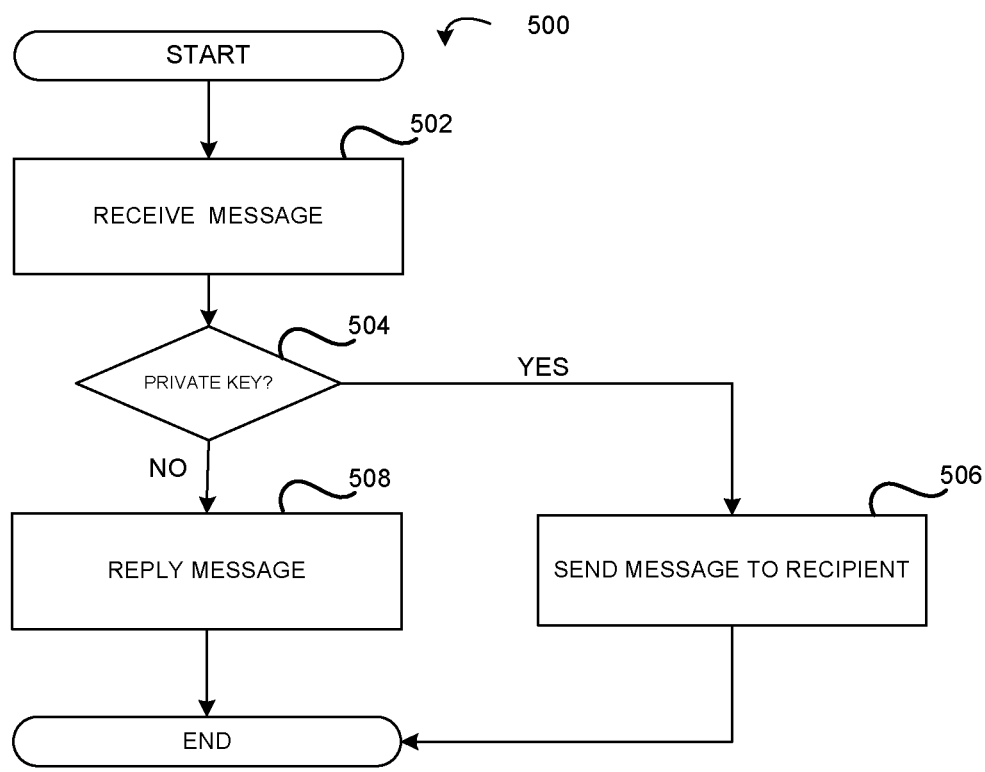
FIG. 5 is a flowchart illustrating a method of sending a reply message by a messaging center when it is determined a recipient cannot decrypt the message in accordance with one example embodiment of the present disclosure.

In one embodiment, encrypted messages may pass through a messaging center before being forwarded to the recipient. The messaging center may include a proxy server, a dedicated messaging server, an enterprise server, or other centralized message handling server. FIG. 5 illustrates an example method 500 according to this embodiment. An encrypted message sent by the sender to a recipient is first be received by the messaging center (block 502). The messaging center may determine whether an intended recipient has the correct private key to decrypt a received encrypted message (block 504). In some instances, this include determining whether the message has been encrypted using the current public key. The messaging center may filter out messages that the recipient cannot decrypt due to the absence of a private key or that have been encrypted using a key other then the current public key. If the messaging center determines that a recipient has the required private key, e.g. if the message is encrypted using the current public key, the encrypted message is forwarded to the recipient device (block 506). Where there are messages that a recipient device cannot decrypt since they do not have the correct private key, the messaging center may automatically send a reply message to the sender indicating that the message cannot be decrypted and that the public key used for a particular recipient is incorrect (block 508). As well, the reply message may contain a copy of the correct current public key for the recipient. The reply message may also request the sender to re-send the message encrypted with the provided current public key. As described above, the messaging center may also send a reply message to the sender where the recipient device has a private key for decrypting the encrypted message, but the private key is expired or is a secondary key.

There may be instances where a recipient device creates a new public/private key pair. In such an embodiment, it may be advantageous for the device to notify all contacts of the new public key. A user-option may be available for the device to inform all stored contacts when a new public/private key pair has been created for the portable electronic device 100. In one embodiment, the portable electronic device 100 automatically sends a message to all contacts in response to detecting a new public key/private key pair on the portable electronic device 100. The message contains the new current public key of the user and would indicate to the contacts that future messages sent to the device should use the new public key to encrypt the message. If the device has changed its key pair because the old key has expired, the message sent to the contacts may be signed with the expired private key to provide the contacts with an assurance that the message has come from the correct device. The contacts may be all the known secure email users in a user's address book. The group of known secure email users may be determined by analyzing the people from whom the device has received messages or to whom the device has sent messages in the past few days, week, month etc. As previously discussed, in some embodiments the reply message is not sent until user confirmation is received.

Upon receiving a reply message from the recipient, a sender may respond in a number of ways. In an embodiment, the sender's portable electronic device 100 contains a convenience feature that accepts the reply message and automatically resends the message unencrypted. In another embodiment, the portable electronic device 100 of the sender automatically stores the new current public key of the recipient in its key storage 162 but does not resend the message to the recipient. Alternatively, the sender's device may prompt the sender to authorize the storage of the new current public key in its key storage 162. In another embodiment, the sender's portable electronic device 100 may store the new current public key and may automatically re-encrypt the message with the current public key before resending the message. The resending of the message re-encrypted with the current public key may also depend on receipt of user confirmation from the sender.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

What is claimed is:

1. A method of secure messaging using an electronic device, the method comprising:
   detecting a new key pair stored in memory on the device, the new key pair including a new public key and a new private key; and
   automatically sending a message to contacts of the device in response to detecting the new key pair, the message including the new public key,
   wherein the new key pair replaces an old key pair stored in the memory of the device, the old key pair including an old public key and an old private key,
   wherein the message is signed using the old private key.

2. The method of claim 1, wherein the message includes a request to the contacts to send messages encrypted with the new public key.

3. The method of claim 1, further including:
   detecting an expired key pair, the expired key pair including an expired public key and an expired private key; and
   generating the new key pair.

4. The method of claim 1, wherein automatically sending the message includes:
   displaying a send option on the device, and
   in response to receipt of an acceptance, sending the message.

5. The method of claim 1, further comprising:
   displaying a notification option on the device, wherein the notification includes sending the message to the contacts after detecting the new key pair.

6. The method of claim 1, wherein the contacts include secure email addresses stored on the electronic device.

7. A non-transitory computer-readable medium storing computer-executable instructions which, when executed, configure a processor to perform the method claimed in claim 1.

8. An electronic device, comprising:
   a communication subsystem for sending and receiving communications over a network;
   a memory;
   a processor; and
   a messaging application having computer-executable instructions which, when executed, configure the processor to,
      detect a new key pair stored in the memory, the new key pair including a new public key and a new private key; and
      automatically send a message to contacts of the device in response to detecting the new key pair, the message including the new public key,
      wherein the new key pair replaces an old key pair stored in the memory of the device, the old key pair including an old public key and an old private key,
      wherein the message is signed using the old private key.

9. The electronic device of claim 8, wherein the message includes a request to the contacts to send messages encrypted with the new public key.

10. The electronic device of claim 8, wherein the instructions configure the processor to:
    detect an expired key pair, the expired key pair including an expired public key and an expired private key; and
    generate the new key pair.

11. The electronic device of claim 8, wherein the instructions configure the processor to automatically send the message by:
    displaying a send option on the device, and
    in response to receipt of an acceptance, sending the message.

12. The electronic device of claim 8, wherein the instructions configure the processor to:
    display a notification option on the device, wherein the notification includes sending the message to the contacts after detecting a new key pair.

13. A method of secure messaging using an electronic device, the method comprising:
    storing a primary key pair and a secondary key pair in memory on the device, the primary key pair including a primary public key and a primary private key and the secondary key pair including a secondary public key and a secondary private key;
    receiving, at the device, an encrypted message sent by a sender;
    determining that the encrypted message cannot be decrypted using either the primary private key or the secondary private key; and
    automatically sending a reply message to the sender in response to determining that the encrypted message cannot be decrypted.

14. The method of claim 13, wherein the reply message includes the primary public key.

15. The method of claim 14, wherein the reply message includes a request to the sender to re-send the message encrypted with the primary public key.

16. The method of claim 13, further comprising:
    determining that the encrypted message is encrypted with the secondary public key; and
    automatically sending a reply message in response to determining that the encrypted message is encrypted with the secondary public key, wherein the reply message includes the primary public key.

17. The method of claim 16, wherein the reply message is signed using the secondary private key.

18. The method of claim 13 wherein determining includes attempting decryption using the primary private key and determining that the attempted decryption failed.

19. The method of claim 13 wherein determining includes attempting decryption using the secondary private key and determining that the attempted decryption is failed.

20. The method of claim 13, further comprising:
    displaying a key pair option on the device, and
    in response to receiving an input, designating a key pair as the primary key pair.

21. The method of claim 13, wherein automatically sending the message includes:
    displaying a send option on the device, and
    in response to receipt of an acceptance, sending the message.

22. A non-transitory computer-readable medium storing computer-executable instructions which, when executed, configure a processor to perform the method claimed in claim 13.

23. An electronic device, comprising:
    a communication subsystem for sending and receiving communications over a network;
    a memory;
    a processor; and
    a messaging application having computer-executable instructions which, when executed, configure the processor to, store a primary key pair and a secondary key pair in memory on the device, the primary key pair including a primary public key and a primary private key and the secondary key pair including a secondary public key and a secondary private key;

receive, at the device, an encrypted message sent by a sender;

determine that the encrypted message cannot be decrypted using either the primary private key or the secondary private key; and automatically send a reply message to the sender in response to determining that the encrypted message cannot be decrypted.

24. The electronic device of claim 23, wherein the reply message includes the primary public key.

25. The electronic device of claim 24, wherein the reply message includes a request to the sender to re-send the message encrypted with the primary public key.

26. The electronic device of claim 24, wherein the instructions configure the processor to:

display a key pair option on the device, and in response to receiving an input, designate a key pair as the primary key pair.

27. The electronic device of claim 23, wherein the instructions configure the processor to:

determine that the encrypted message is encrypted with the secondary public key; and automatically send a reply message in response to determining that the encrypted message is encrypted with the secondary public key, wherein the reply message includes the primary public key.

28. The electronic device of claim 27, wherein the reply message is signed using the secondary private key.

29. The electronic device of claim 23 wherein the instructions configure the processor to attempt decryption using the primary private key and to determine that the attempted decryption failed.

30. The electronic device of claim 23 wherein the instructions configure the processor to attempt decryption using the secondary private key and to determine that the attempted decryption is failed.

31. The electronic device of claim 23, wherein the instructions configure the processor to automatically send the message by:

displaying a send option on the device, and in response to receipt of an acceptance, sending the message.

32. A messaging server, comprising:

a communication subsystem for sending and receiving communications over a network;

a memory;

a processor; and the memory including computer-executable instructions which, when executed, configure the processor to:

store a primary key pair and a secondary key pair in memory on the device, the primary key pair including a primary public key and a primary private key and the secondary key pair including a secondary public key and a secondary private key;

receive an encrypted message sent by a sender;

determine that the encrypted message cannot be decrypted using either the primary private key or the secondary private key; and automatically send a reply message to the sender in response to determining that the encrypted message cannot be decrypted.

33. A method of secure messaging using an electronic device, the method comprising:

detecting an expired key pair, the expired key pair including an expired public key and an expired private key;

generating a new key pair, wherein the message is signed using the expired private key;

detecting the new key pair stored in memory on the device, the new key pair including a new public key and a new private key; and automatically sending a message to contacts of the device in response to detecting the new key pair, the message including the new public key.

34. An electronic device, comprising:

a communication subsystem for sending and receiving communications over a network;

a memory;

a processor; and a messaging application having computer-executable instructions which, when executed, configure the processor to, detect an expired key pair, the expired key pair including an expired public key and an expired private key;

generate a new key pair, wherein the message is signed using the expired private key;

detect the new key pair stored in the memory, the new key pair including a new public key and a new private key; and automatically send a message to contacts of the device in response to detecting the new key pair, the message including the new public key.

* * * * *